United States Patent
Habu et al.

(10) Patent No.: US 9,046,015 B2
(45) Date of Patent: Jun. 2, 2015

(54) CATALYTIC CONVERTER WARM-UP CONTROL APPARATUS FOR HYBRID VEHICLE

(71) Applicant: HONDA MOTOR CO., LTD., Tokyo (JP)

(72) Inventors: Ikue Habu, Wako (JP); Mahito Shikama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 13/910,118

(22) Filed: Jun. 5, 2013

(65) Prior Publication Data

US 2014/0007561 A1    Jan. 9, 2014

(30) Foreign Application Priority Data

Jul. 9, 2012 (JP) ................................. 2012-153477

(51) Int. Cl.

| | |
|---|---|
| *F01N 3/00* | (2006.01) |
| *F01N 9/00* | (2006.01) |
| *F01N 11/00* | (2006.01) |
| *B60K 6/442* | (2007.10) |
| *B60W 10/06* | (2006.01) |
| *F02D 41/02* | (2006.01) |
| *B60W 20/00* | (2006.01) |
| *F02D 41/04* | (2006.01) |
| *F02D 41/12* | (2006.01) |

(52) U.S. Cl.
CPC ............... *F01N 9/00* (2013.01); *F01N 11/002* (2013.01); *Y02T 10/52* (2013.01); *Y02T 10/6286* (2013.01); *Y02T 10/6234* (2013.01); *Y02T 10/47* (2013.01); *B60K 6/442* (2013.01); *B60W 10/06* (2013.01); *F02D 41/021* (2013.01); *F02D 41/0255* (2013.01); *B60Y 2300/474* (2013.01); *B60W 20/1082* (2013.01); *F02D 41/042* (2013.01); *F02D 41/123* (2013.01)

(58) Field of Classification Search
USPC .................................................. 60/272–324
See application file for complete search history.

(56) References Cited

U.S. PATENT DOCUMENTS 6,059,057 A * 5/2000 Yamazaki et al. ....... 180/65.235
8,756,924 B2 * 6/2014 Gonze et al. .................... 60/300

(Continued)

FOREIGN PATENT DOCUMENTS

| JP | 09-329060 | 12/1997 |
| JP | 2009-214704 | 9/2009 |

(Continued)

OTHER PUBLICATIONS

Japanese Office Action for corresponding JP Application No. 2012-153477, Apr. 9, 2014.

*Primary Examiner* — Jesse Bogue
(74) *Attorney, Agent, or Firm* — Mori & Ward, LLP (57) ABSTRACT

A catalytic converter warm-up control apparatus for a hybrid vehicle includes a catalytic converter warm-up controller, a temperature parameter acquisition device, a warm-up control parameter setting device, and a motoring execution device. The catalytic converter warm-up controller is configured to execute warm-up control to warm up a catalytic converter of the hybrid vehicle for activating the catalytic converter upon start-up of an internal combustion engine provided in the hybrid vehicle. The warm-up control parameter setting device is configured to set warm-up control parameters used in the warm-up control in accordance with the temperature parameter acquired by the temperature parameter acquisition device. The motoring execution device is configured to execute motoring of the internal combustion engine by a first electric motor in a predetermined operation state. The catalytic converter warm-up controller is configured to execute the warm-up control in accordance with an execution state of the motoring.

13 Claims, 9 Drawing Sheets

(56) References Cited

U.S. PATENT DOCUMENTS

2008/0282673 A1* 11/2008 Gonze et al. .................. 60/284
2008/0282686 A1* 11/2008 Gonze et al. .................. 60/300
2011/0283675 A1* 11/2011 Gonze et al. .................. 60/274

FOREIGN PATENT DOCUMENTS

JP     2011-93372     5/2011
JP     2011-093372    5/2011

* cited by examiner

CATALYTIC CONVERTER WARM-UP CONTROL APPARATUS FOR HYBRID VEHICLE

CROSS-REFERENCE TO RELATED APPLICATIONS

The present application claims priority under 35 U.S.C. §119 to Japanese Patent Application No. 2012-153477, filed Jul. 9, 2012, entitled "Catalytic Converter Warm-up Control Apparatus for Hybrid Vehicle." The contents of this application are incorporated herein by reference in their entirety.

BACKGROUND OF THE INVENTION

1. Field of the Invention

The present disclosure relates to a catalytic converter warm-up control apparatus for a hybrid vehicle.

2. Discussion of the Background

Examples of known related-art hybrid-vehicle catalytic converter warm-up control apparatuses include one disclosed in Japanese Unexamined Patent Application Publication No. 2011-93372. Such a hybrid vehicle includes a power source which includes an internal combustion engine and a first motor, and further includes a purifying catalytic converter for purifying an exhaust gas discharged from the engine. In such a catalytic converter warm-up control apparatus, a catalytic converter temperature sensor detects a temperature of the purifying catalytic converter. If a predetermined warm-up condition is satisfied, for example, the detected temperature of the catalytic converter is less than or equal to a predetermined temperature, a catalytic converter warm-up operation for activating the purifying catalytic converter is executed.

During the catalytic converter warm-up operation, when depression of an accelerator pedal is released, deceleration fuel cut for stopping supply of fuel to the engine is executed and the number of revolutions of the engine is controlled to be less than or equal to the upper limit. Thus, during the deceleration fuel cut, the purifying catalytic converter is prevented from decreasing in temperature and purifying capacity due to supply of a large quantity of air which is not subjected to combustion as the engine is motored by the first motor.

SUMMARY OF THE INVENTION

According to one aspect of the present invention, a catalytic converter warm-up control apparatus for a hybrid vehicle includes a catalytic converter warm-up controller, a temperature parameter acquisition device, a warm-up control parameter setting device, and a motoring execution device. The catalytic converter warm-up controller is configured to execute warm-up control to warm up a catalytic converter of the hybrid vehicle for activating the catalytic converter upon start-up of an internal combustion engine provided in the hybrid vehicle. The catalytic converter is provided to purify an exhaust gas discharged from the internal combustion engine. The temperature parameter acquisition device is configured to acquire a temperature parameter indicating a temperature of the internal combustion engine. The warm-up control parameter setting device is configured to set warm-up control parameters used in the warm-up control in accordance with the temperature parameter acquired by the temperature parameter acquisition device. The motoring execution device is configured to execute motoring of the internal combustion engine by a first electric motor in a predetermined operation state. The first electric motor is provided to supply and receive motive power to and from the internal combustion engine and a drive wheel of the hybrid vehicle. The catalytic converter warm-up controller is configured to execute the warm-up control in accordance with an execution state of the motoring.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
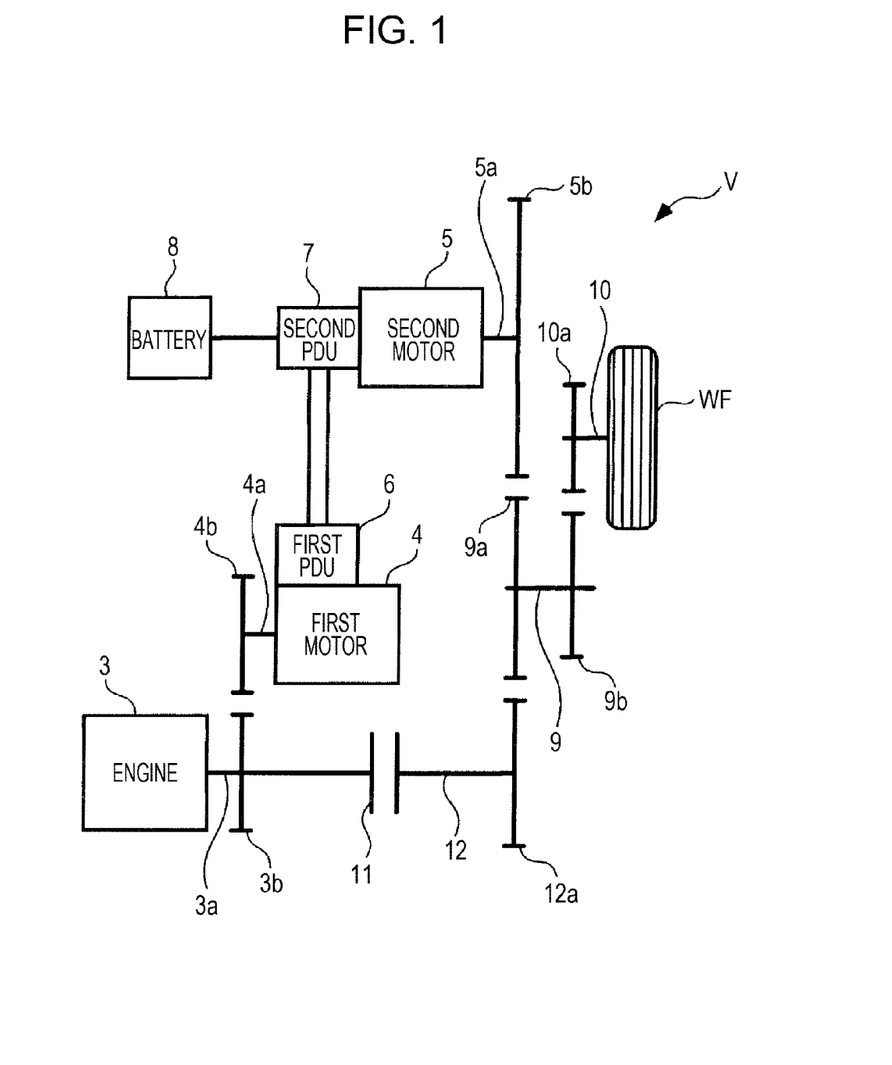
FIG. 1 is a schematic diagram illustrating part of a hybrid vehicle according to an embodiment.

FIG. 1 illustrates a hybrid vehicle (hereinafter, simply referred to as a "vehicle") V which is a four-wheel vehicle that includes a power source including an internal combustion engine (hereinafter, referred to as an "engine") 3, a first motor 4, and a second motor 5, and further includes right and left front wheels WF (only one illustrated), serving as drive wheels, and right and left rear wheels (not illustrated), serving as driven wheels.

Each of the first and second motors 4 and 5 is a motor-generator and includes a brushless DC motor. The first motor 4 includes a stator (not illustrated) which is electrically connected to a first power drive unit (PDU) 6. The second motor 5 includes a stator (not illustrated) which is electrically connected through a second PDU 7 to a battery 8.

The first and second PDUs 6 and 7 each include an electric circuit, such as an inverter, and are electrically connected to each other. Accordingly, the first motor 4 and the second motor 5 can supply and receive electric power to and from each other through the first PDU 6 and the second PDU 7. Each of the first PDU 6 and the second PDU 7 is controlled by a control signal from an ECU 2 (refer to FIG. 3), thereby controlling operations, such as power running or electric power generation of the first and second motors 4 and 5 and charging/discharging of the battery 8.

The first motor 4 includes a rotation shaft 4*a* provided with a gear 4*b* which is engaged with a gear 3*b* attached to a crankshaft 3*a* of the engine 3. The engine 3 and the first motor 4 can supply and receive motive power to and from each other through the gears 3*b* and 4*b*. The second motor 5 includes a rotation shaft 5*a* provided with a gear 5*b* which is engaged with a first gear 9*a* attached to a drive shaft 9. The drive shaft 9 is provided with a second gear 9*b* which is engaged with a final gear 10*a* attached to an axle 10 of the front wheel WF. The above-described arrangement enables the second motor 5 and the front wheel WF to supply and receive motive power to and from each other through, for example, the gear 5*b*, the first and second gears 9*a* and 9*b*, and the final gear 10*a*.

Furthermore, the crankshaft 3*a* of the engine 3 is coupled to a countershaft 12 through an overdrive (OD) clutch 11. The countershaft 12 is provided with a gear 12*a* which is engaged with the first gear 9*a* of the drive shaft 9. The OD clutch 11 includes an electromagnetic clutch whose engagement and disengagement are controlled by a control signal from the ECU 2 (refer to FIG. 3). The gear ratio of the gear 12*a* of the countershaft 12 to the first gear 9*a* of the drive shaft 9 and the gear ratio of the second gear 9*b* to the final gear 10*a* are set to substantially 1:1. Accordingly, while the OD clutch 11 is engaged, the motive power of the engine 3 is transmitted at substantially constant velocity from the crankshaft 3*a* through the above-described gears to the front wheel WF.

The above-described configuration allows the vehicle V to be operated in any of various operation modes by controlling, for example, the engine 3, the first and second motors 4 and 5, and the OD clutch 11. The operation modes include an electronically-controlled continuously variable transmission (ECVT) travel mode, an engine (ENG) travel mode, an electric vehicle (EV) travel mode, and a deceleration and electric power generation mode. These operation modes will be described below in turn.

In the ECVT travel mode, traveling is performed such that electric power is generated by the first motor 4 using motive power produced by combustion in the engine 3, the generated electric power is transmitted (electrical pass) to the second motor 5, and the front wheel WF is driven by power running of the second motor 5. In the ECVT travel mode, controlling the first and second PDUs 6 and 7 enables the motive power of the engine 3 to be steplessly varied. Due to the nature of the first and second motors 4 and 5, selection of the ECVT travel mode in a low-to-medium speed range offers high efficiency.

In the ENG travel mode, traveling is performed such that while the OD clutch 11 is engaged, the motive power of the engine 3 is transmitted (mechanical pass) through, for example, the OD clutch 11 and the countershaft 12 to the front wheel WF. As described above, the gear ratios of the gears arranged between the OD clutch 11 and the front wheel WF are set to substantially 1:1. Accordingly, selection of the ENG travel mode in a high speed range offers high efficiency. The OD clutch 11 is disengaged in the other operation modes.

In the EV travel mode, traveling is performed such that while the operation of the engine 3 is stopped, the front wheel WF is driven by power running of the second motor 5 using electric power supplied from the battery 8.

In the deceleration and electric power generation mode, while the vehicle V is in a predetermined deceleration operation state, supply of fuel to the engine 3 is stopped (fuel cut) to stop the operation of the engine 3 and electric power is generated by the second motor 5 using kinetic energy of the vehicle V. In this case, a magnetoresistance associated with such an electric power generating operation of the second motor 5 provides a braking force of the vehicle V.

When the battery 8 is in a partially charged condition, electric power generated by the second motor 5 is stored in the battery 8 for regeneration. On the other hand, when the battery 8 is in a fully charged condition, electric power generated by the second motor 5 is transmitted to the first motor 4 and the engine 3 is motored by power running of the first motor 4, so that the electric power is transformed into mechanical energy or thermal energy. In this case, a magnetoresistance in the second motor 5 provides a braking force of the vehicle V. In the following description, such fuel cut involving motoring of the engine 3 by the first motor 4 will be referred to as "motoring fuel cut" as appropriate.

Figure 2:
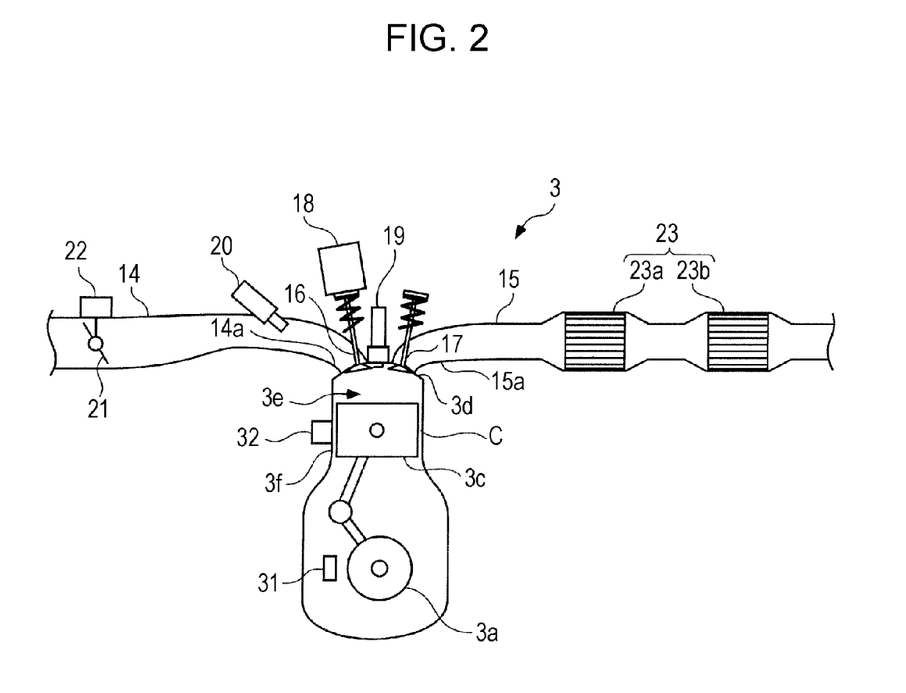
FIG. 2 is a schematic diagram illustrating a configuration of an engine.

The configuration of the engine 3 will be described in detail with reference to FIG. 2. The engine 3 is, for example, a gasoline engine that includes four cylinders C (only one illustrated in FIG. 2). In each cylinder C, a combustion chamber 3*e* is defined between a piston 3*c* and a cylinder head 3*d*. The combustion chamber 3*e* is connected to an intake passage 14 and an exhaust passage 15. The intake passage 14 has an intake port 14*a* which is provided with an intake valve 16 for opening and closing the port. The exhaust passage 15 has an exhaust port 15*a* which is provided with an exhaust valve 17 for opening and closing the port.

The intake valve 16 is driven by an intake cam (not illustrated) attached to an intake camshaft (not illustrated). The exhaust valve 17 is driven by an exhaust cam (not illustrated) attached to an exhaust camshaft (not illustrated). The intake and exhaust camshafts are rotated in synchronization with the crankshaft 3*a*.

The engine 3 further includes an intake cam phase varying mechanism 18 for varying an intake camshaft phase (hereinafter, referred to as an "intake cam phase") CAIN relative to the crankshaft 3*a* in a stepless manner. The intake cam phase varying mechanism 18 is motor-operated and includes a CAIN actuator 18*a*. The CAIN actuator 18*a* is controlled by a control signal from the ECU 2, so that the intake cam phase CAIN is controlled (refer to FIG. 3).

In the engine 3, a spark plug 19 and a fuel injection valve (hereinafter, referred to as an "injector") 20 are arranged for each cylinder C. The spark plug 19, which is attached to the cylinder head 3*d*, ignites an air-fuel mixture in the cylinder C by generating spark. The injector 20, which is attached to an intake manifold of the intake passage 14, injects a fuel to the intake port 14*a*. Ignition timing IG of the spark plug 19 and a fuel injection amount and fuel injection timing of the injector 20 are controlled by control signals from the ECU 2 (refer to FIG. 3).

The intake passage 14 is provided with a throttle valve 21. The throttle valve 21 is coupled to a throttle (TH) actuator 22 which includes a DC motor. The TH actuator 22 is controlled by a control signal from the ECU 2 (refer to FIG. 3). Controlling an opening degree of the throttle valve 21 regulates the quantity of air (air-intake) QA sucked into the cylinder C.

A catalytic converter 23 for purifying an exhaust gas discharged from the cylinder C is disposed in the exhaust passage 15. The catalytic converter 23 includes a close-coupled catalytic converter 23*a* disposed just downstream of an exhaust manifold and an underfloor catalytic converter 23*b* disposed downstream of the close-coupled catalytic converter 23*a*. The close-coupled catalytic converter 23*a* and the underfloor catalytic converter 23*b* each function as a three-way catalytic converter.

The crankshaft 3*a* of the engine 3 is provided with a crank angle sensor 31. The crank angle sensor 31 outputs a pulse signal CRK every predetermined crank angle (e.g., 30°) in association with rotation of the crankshaft 3a. The ECU 2 calculates the number of revolutions (hereinafter, "engine revolution number") NE of the engine 3 on the basis of the signal CRK.

The engine 3 includes a cylinder block 3f which is provided with a water temperature sensor 32. The water temperature sensor 32 detects a temperature (hereinafter, "engine water temperature") TW of cooling water circulating through the cylinder block 3f and outputs a detection signal indicating the detected temperature to the ECU 2. The ECU 2 further receives a detection signal indicating an amount of depression (hereinafter, "accelerator position") AP of an accelerator pedal (not illustrated) of the vehicle V from an accelerator position sensor 33 (refer to FIG. 3).

Figure 3:
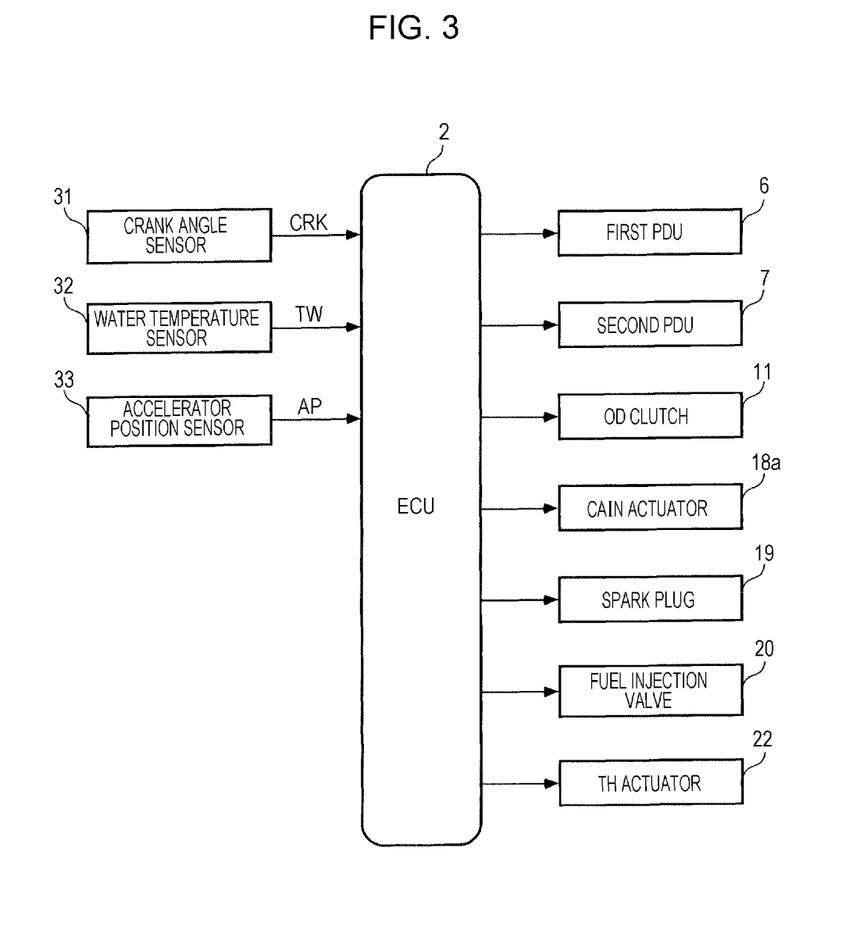
FIG. 3 is a schematic diagram illustrating a control unit that executes warm-up control for a catalytic converter.

The ECU 2 includes a microcomputer including a CPU, a RAM, a ROM, and an I/O interface which are not illustrated. The ECU 2 identifies an operation state of the vehicle V on the basis of detection signals from the above-described sensors 31 to 33, determines an operation mode of the vehicle V in accordance with the identified operation state, and executes various control processes for the engine 3 and the first and second motors 4 and 5.

In this embodiment, the ECU 2 corresponds to a catalytic converter warm-up control unit, a warm-up control parameter setting unit, a motoring execution unit, and an inactive-state determination unit.

Figure 4:
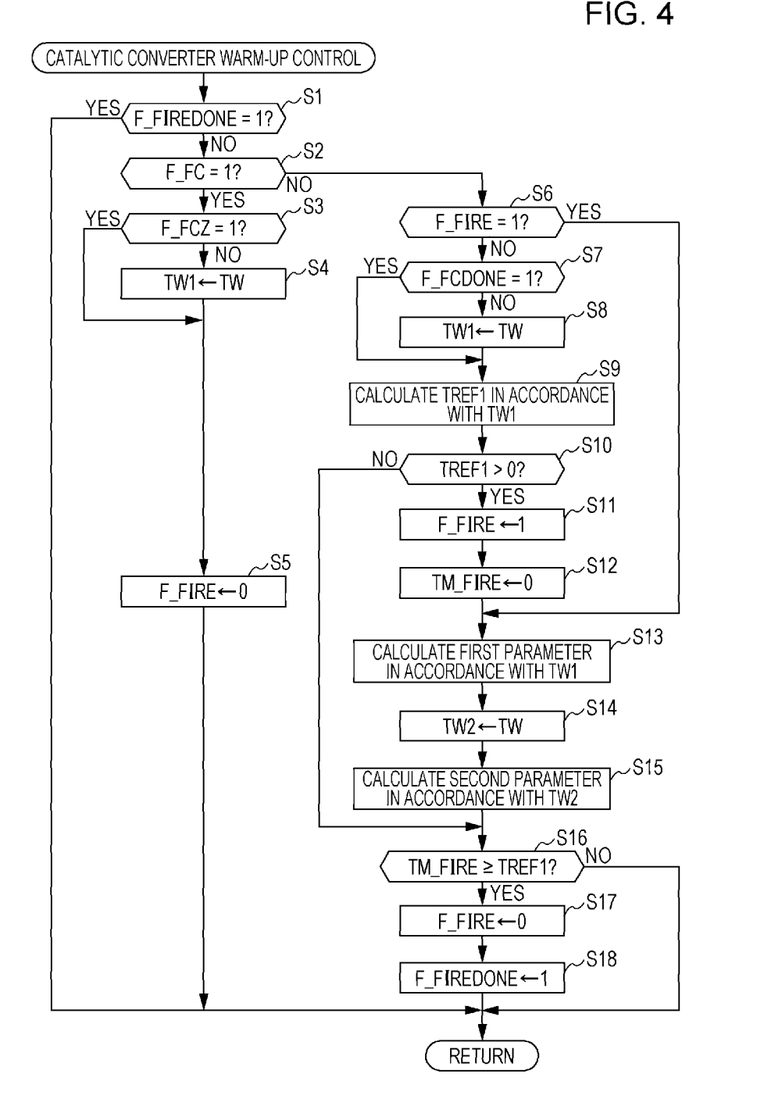
FIG. 4 is a flowchart illustrating a catalytic converter warm-up control process executed by the control unit.

FIG. 4 illustrates a catalytic converter warm-up control process executed by the ECU 2. This catalytic converter warm-up control is executed to increase a temperature of the catalytic converter 23 (i.e., the close-coupled catalytic converter 23a and the underfloor catalytic converter 23b) upon start-up of the engine 3 in order to activate the catalytic converter. This process is repeatedly executed every predetermined period.

In this process, whether a warm-up control done flag F_FIREDONE indicates "1" is determined in step S1. If YES, namely, the warm-up control has already been executed and completed, the process is terminated.

If NO, namely, the warm-up control has not been completed yet, whether a fuel cut flag F_FC indicates "1" is determined in step S2. The fuel cut flag F_FC is set to "1" when the vehicle V is in a predetermined deceleration operation state, for example, the accelerator position AP is substantially 0, the engine revolution number NE is greater than or equal to a predetermined number of revolutions, and the motoring fuel cut in the deceleration and electric power generation mode is requested.

If YES in step S2, whether the latest value F_FCZ of the fuel cut flag indicates "1" is determined in step S3. If NO, namely, this process corresponds to a process cycle performed just after the motoring fuel cut is requested, the engine water temperature TW at that time is set to a first reference water temperature TW1 in step S4. The process then proceeds to step S5. On the other hand, if YES in step S3, the process skips step S4 and proceeds to step S5.

In step S5, the motoring fuel cut is executed in response to the request and the warm-up control for the catalytic converter 23 is not executed and a warm-up control flag F_FIRE indicating no execution is set to "0". The process is terminated.

Specifically, if the motoring fuel cut is requested after start-up of the engine 3, the fuel cut is preferentially executed and the warm-up control for the catalytic converter 23 is inhibited. The same applies to a case where the motoring fuel cut is requested during execution of the warm-up control. As described above, the preferential execution of the motoring fuel cut during the deceleration operation of the vehicle V activates a magnetoresistance associated with the electric power generating operation of the second motor 5, thus reliably providing a braking force of the vehicle V required for the deceleration operation.

If NO in step S2, namely, F_FC=0, whether the warm-up control flag F_FIRE indicates "1" is determined in step S6. If NO in step S6, namely, the warm-up control has not been performed yet, whether a fuel cut done flag F_FCDONE indicates "1" is determined in step S7.

If NO in step S7, namely, the warm-up control has been immediately started upon start-up of the engine 3 without execution of the motoring fuel cut, the engine water temperature TW at that time is set to the first reference water temperature TW1 in step S8. The process then proceeds to step S9, which will be described later. On the other hand, if YES in step S7, namely, the warm-up control has been started after completion of the fuel cut, the process skips step S8 and proceeds to step S9.

As will be appreciated from the above description, if the motoring fuel cut is not executed, the first reference water temperature TW1 is set to the engine water temperature TW at start of the warm-up control in step S8. On the other hand, if the motoring fuel cut has been executed, the first reference water temperature TW1 is set to the engine water temperature TW at start of the fuel cut in step S4.

Figure 5:
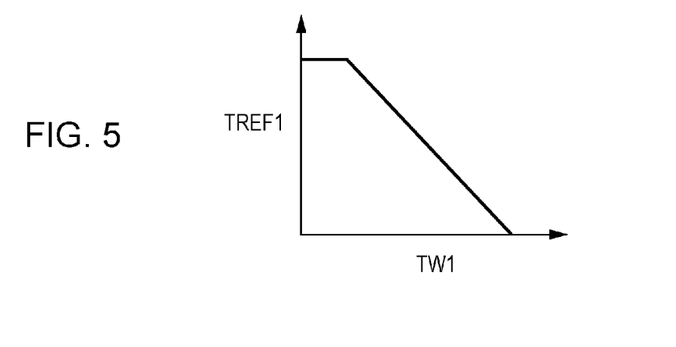
FIG. 5 is a table for calculating estimated execution time of the warm-up control.

In step S9 following step S7 or S8, warm-up control estimated execution time TREF1 which is estimated time at which the warm-up control is to be executed is calculated in accordance with the first reference water temperature TW1, set in that manner, by searching a table of FIG. 5. In this table, since it is estimated that as the first reference water temperature TW1 is lower, the temperature of the catalytic converter 23 is lower, the estimated execution time TREF1 is set to a larger value so that the warm-up control is performed for a longer period.

Whether the estimated execution time TREF1 set in that manner is greater than a value 0 is determined in step S10. If NO, namely, the calculated estimated execution time TREF1 is less than or equal to 0 because the engine water temperature TW is high, the warm-up control for the catalytic converter 23 is not executed and the process proceeds to step S16, which will be described later.

On the other hand, if YES in step S10, it is determined that the warm-up control should be started and the warm-up control flag F_FIRE is set to "1" in step S11. A value (hereinafter, "warm-up control execution time") TM_FIRE of a count up timer that counts up elapsed time from the start of the warm-up control is reset to 0 in step S12. The process proceeds to step S13, which will be described later. If YES in step S6, namely, the warm-up control has been started, the process skips steps S7 to S12 and proceeds to step S13.

In step S13, a first parameter is calculated in accordance with the first reference water temperature TW1. The first parameter is one of warm-up control parameters used in the warm-up control and is to be set depending on the temperature of the catalytic converter 23. The first reference water temperature TW1 is used as a parameter indicating the temperature of the catalytic converter 23. The first parameter and a method of setting the first parameter will be described in detail below.

The first parameter includes the warm-up control estimated execution time TREF1 calculated in step S11 and further includes a target engine revolution number NECMD of the engine revolution number NE, a target air-intake QACMD of the air-intake QA, target ignition timing IGCMD of the ignition timing IG, a target intake cam phase CAINCMD of the intake cam phase CAIN, and a fuel reduction coefficient KF1.

The target engine revolution number NECMD, the target air-intake QACMD, the target ignition timing IGCMD, the target intake cam phase CAINCMD, and the fuel reduction coefficient KF1 are calculated using tables illustrated in FIGS. 6 to 10, respectively.

In each of the tables of FIGS. 6 to 9, the axis of abscissas indicates the warm-up control execution time TM_FIRE. Each table includes a low-temperature table used when the first reference water temperature TW1 is a first predetermined temperature TWL and a high-temperature table used when the first reference water temperature TW1 is a second predetermined temperature TWH higher than the first predetermined temperature TWL. If the first reference water temperature TW1 does not agree with the first and second temperatures TWL and TWH, the first parameter is calculated by interpolation.

Figure 6:
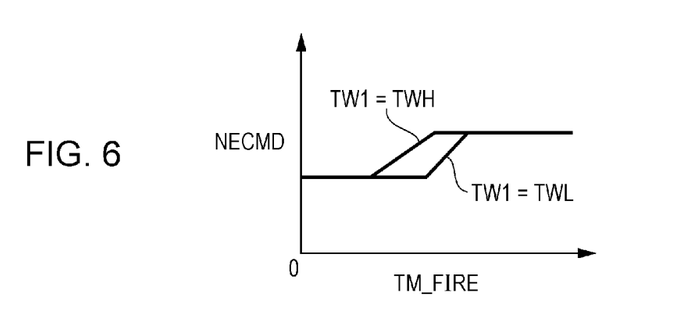
FIG. 6 is a table for setting a target engine revolution number used in the warm-up control.

In the table of FIG. 6, the target engine revolution number NECMD is set to a small value in early to middle stages, in which the execution time TM_FIRE is relatively short, of the warm-up control. The reason is to reduce the amount of exhaust gas in order to reduce the amount of emission of hazardous substances, such as HC, to the catalytic converter 23 in an inactive state. The target engine revolution number NECMD is set so as to gradually increase such that the amount of emission of the hazardous substances to the inactive catalytic converter 23 does not sharply increase and is further set to a predetermined high value. The reason is to increase the exhaust gas amount so that activation of the underfloor catalytic converter 23b remote from the engine 3 is promoted after activation of the close-coupled catalytic converter 23a close to the engine 3.

In comparison between the low-temperature table and the high-temperature table, the target engine revolution number NECMD set in the low-temperature table is lower than that in the high-temperature table. The reason is to more reliably reduce the exhaust gas amount because it is estimated that as the first reference water temperature TW1 is lower, the temperature of the catalytic converter 23 is lower and the degree of activation is also lower.

Figure 7:
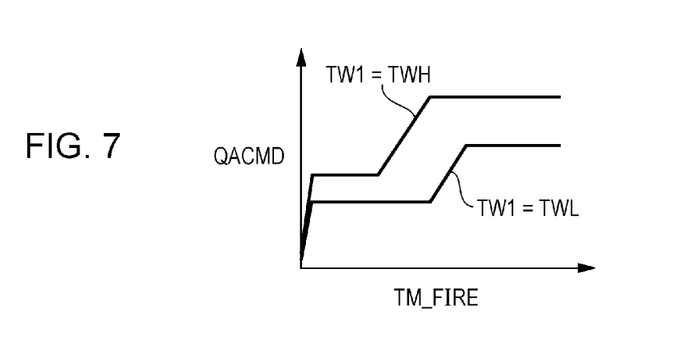
FIG. 7 is a table for setting a target air-intake used in the warm-up control.

In the table of FIG. 7, the target air-intake QACMD is set relative to the warm-up control execution time TM_FIRE and the first reference water temperature TW1 in substantially the same manner as the above-described target engine revolution number NECMD because of the same reason.

Figure 8:
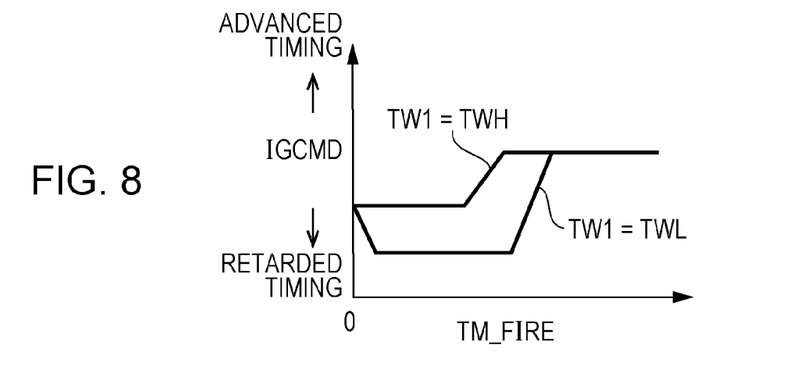
FIG. 8 is a table for setting target ignition timing used in the warm-up control.

In the table of FIG. 8, the target ignition timing IGCMD is set to be retarded in the early to middle stages of the warm-up control so that an exhaust gas temperature is increased to promote activation of the close-coupled catalytic converter 23a and is set to be advanced in the following stage in order to achieve higher fuel economy. Furthermore, since it is estimated in the low-temperature table that the temperature of the catalytic converter 23 is lower and the degree of activation is also lower, the target ignition timing IGCMD is set to be more retarded. In the low-temperature table, the target ignition timing IGCMD is temporarily set to be advanced upon start of the warm-up control. The reason is to increase the combustion performance of the engine 3, particularly, in a low-temperature state upon start-up in order to ensure good starting performance.

Figure 9:
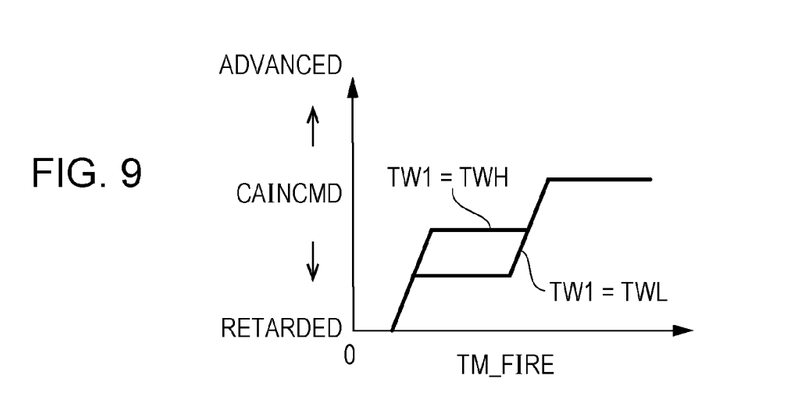
FIG. 9 is a table for setting a target intake cam phase used in the warm-up control.

In the table of FIG. 9, the target intake cam phase CAINCMD is set to the most retarded value in the early stage of the warm-up control. This reason is to delay opening and closing timing of the intake valve 16 in order to suppress vibrations of the engine 3 upon the start-up so that the effective compression ratio is reduced. The target intake cam phase CAINCMD is set to be gradually advanced in the middle stage of the warm-up control in order to increase fuel economy and reduce the amount of emission of hazardous substances and is set to be more advanced in the following stage in order to provide a high torque. The target intake cam phase CAINCMD in the low-temperature table is set to be more retarded than that in the high-temperature table in order to reduce the amount of emission of hazardous substances.

Figure 10:
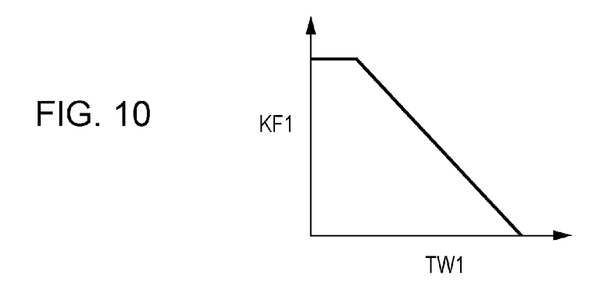
FIG. 10 is a table for calculating a fuel reduction coefficient used in the warm-up control.
Figure 13:
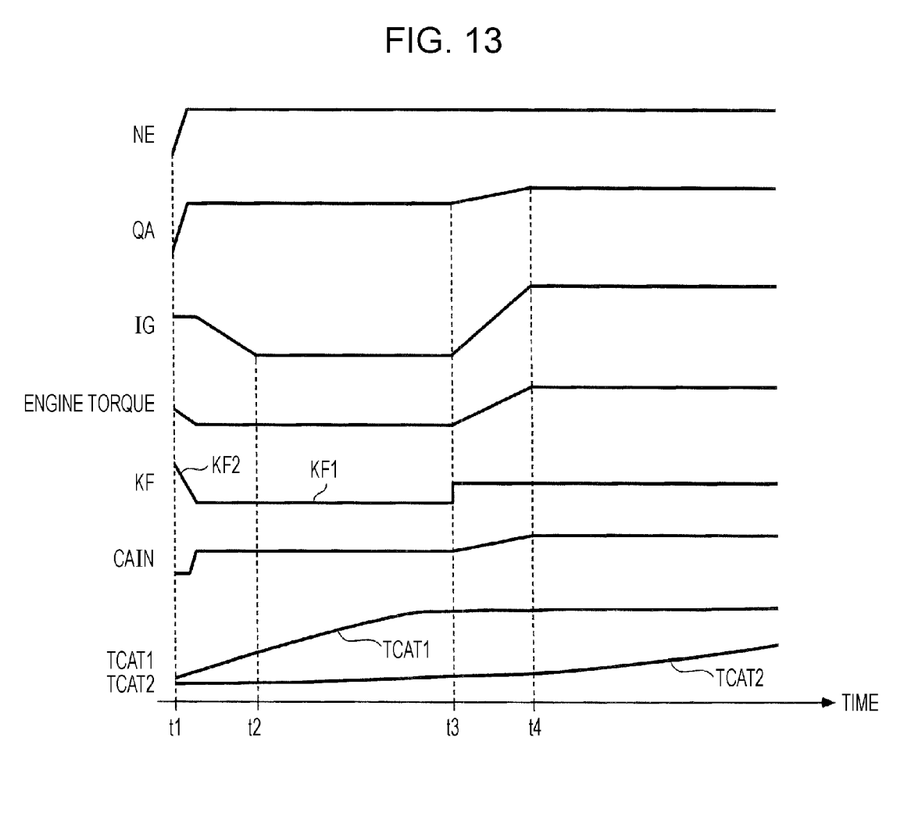
FIG. 13 is a timing chart illustrating an example of an operation achieved by the catalytic converter warm-up control.

The fuel reduction coefficient KF1 is used to reduce the fuel such that the air-fuel ratio is lean in order to reduce the amount of emission of hazardous substances, particularly, HC in the middle stage of the warm-up control (refer to FIG. 13). In the table of FIG. 10, therefore, the fuel reduction coefficient KF1 is set to be higher as the first reference water temperature TW1 is lower.

Referring again to FIG. 4, in step S14 following the above-described step S13, the engine water temperature TW at that time is set to a second reference water temperature TW2. As described above, the second reference water temperature TW2 is set to the engine water temperature TW during execution of the warm-up control, regardless of whether the motoring fuel cut has already been executed.

A second parameter is calculated in accordance with the set second reference water temperature TW2 in step S15. The second parameter is one of the warm-up control parameters and is to be set depending on the temperature of the engine 3. The second reference water temperature TW2 is used as a parameter indicating the temperature of the engine 3. In this embodiment, a fuel increase coefficient KF2 corresponds to the second parameter.

Figure 11:
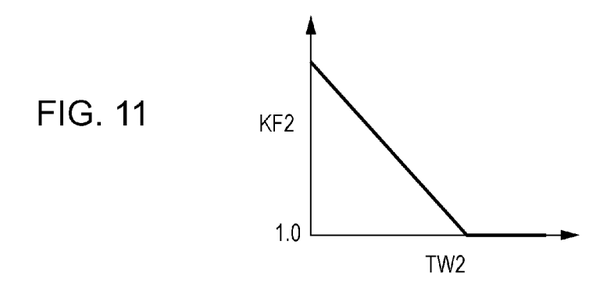
FIG. 11 is a table for calculating a fuel increase coefficient used in the warm-up control.

The fuel increase coefficient KF2 is used to increase the fuel in order to increase the combustion performance in accordance with the degree of atomization of the fuel in a low temperature state upon start-up of the engine 3 (refer to FIG. 13). In a table of FIG. 11, therefore, the fuel increase coefficient KF2 is set to be higher as the second reference water temperature TW2 is lower. When the second reference water temperature TW2 is higher than or equal to a predetermined temperature, the fuel increase coefficient KF2 is set to 1.0.

The first and second parameters are calculated as described above and the warm-up control is executed using the calculated first and second parameters.

In step S16 following the above-described step S15, whether the warm-up control execution time TM_FIRE has reached the estimated execution time TREF1 is determined. If NO in step S16, the process is terminated and the warm-up control is continued.

On the other hand, if YES in step S16, namely, the warm-up control execution time TM_FIRE has reached the estimated execution time TREF1, the warm-up control is to be terminated and the warm-up control flag F_FIRE is set to "0" in step S17. In addition, the warm-up control done flag F_FIRE-DONE is set to "1" in step S18 in order to indicate the completion of the warm-up control. The process is terminated.

An example of an operation achieved by the above-described catalytic converter warm-up control process will be described with reference to FIG. 13. Various parameters illustrated in FIG. 13 are actual values (real values) obtained in warm-up control using the warm-up control parameters (first and second parameters) set in the above-described tables of FIGS. 5 to 11.

In this example, the engine 3 was started at time t1 in a low temperature state in which a temperature TCAT1 of the close-coupled catalytic converter 23a and a temperature TCAT2 of the underfloor catalytic converter 23b were low, and warm-up control was started. Upon start-up (starting) of the engine 3, a fuel correction coefficient KF was set so as to increase due to the fuel increase coefficient KF2 and the ignition timing IG was controlled so as to be advanced, thereby providing good combustion performance and good starting performance. Furthermore, the air-intake QA was controlled at a low value in order to reduce the exhaust gas amount, such that the amount of emission of hazardous substances was reduced while the catalytic converter 23 was inactive. In addition, the intake cam phase CAIN was controlled at the most retarded value, thus suppressing vibrations upon the start-up.

After that, when the engine revolution number NE was increased and the starting of the engine 3 was completed, timing retard control for controlling the ignition timing IG so as to be retarded was executed (from time t2 to time t3). The timing retard control for the ignition timing IG allowed a high-temperature exhaust gas to flow into the close-coupled catalytic converter 23a such that the temperature TCAT1 increased, thus promoting mainly activation of the close-coupled catalytic converter 23a. The air-intake QA was controlled so as to gradually increase and the intake cam phase CAIN was controlled so as to be gradually advanced until the timing retard control was started. In addition, the fuel correction coefficient KF was set so as to decrease due to the fuel reduction coefficient KF1 during the timing retard control, thus reducing the amount of emission of hazardous substances while the catalytic converter 23 was inactive.

Upon activation of the close-coupled catalytic converter 23a, the ignition timing IG was returned to the advanced timing at time t4 while the air-intake QA was controlled so as to become larger and the intake cam phase CAIN was controlled so as to be more advanced. Thus, a large amount of exhaust gas flowed into the underfloor catalytic converter 23b such that the temperature TCAT2 increased, thus promoting mainly activation of the underfloor catalytic converter 23b. After completion of the timing retard control of the ignition timing IG, the fuel correction coefficient KF was feedback-controlled such that the air-fuel ratio reached a target air-fuel ratio, thus maintaining good exhaust gas characteristics.

While the ignition timing IG was controlled so as to be retarded in the above-described timing retard control, engine torque was not increased much as illustrated in FIG. 13. The engine torque might fall below request torque required for the vehicle V. In such a case, a lack of torque may be compensated for by torque produced by power running of the second motor 5. After the timing retard control, since the ignition timing IG was controlled so as to be advanced while the air-intake QA was relatively large, the engine torque was increased. The engine torque might exceed request torque. In such a case, an excess of torque may be transformed into electric power by electric power generation of the second motor 5 and be stored in the battery 8.

Figure 12:
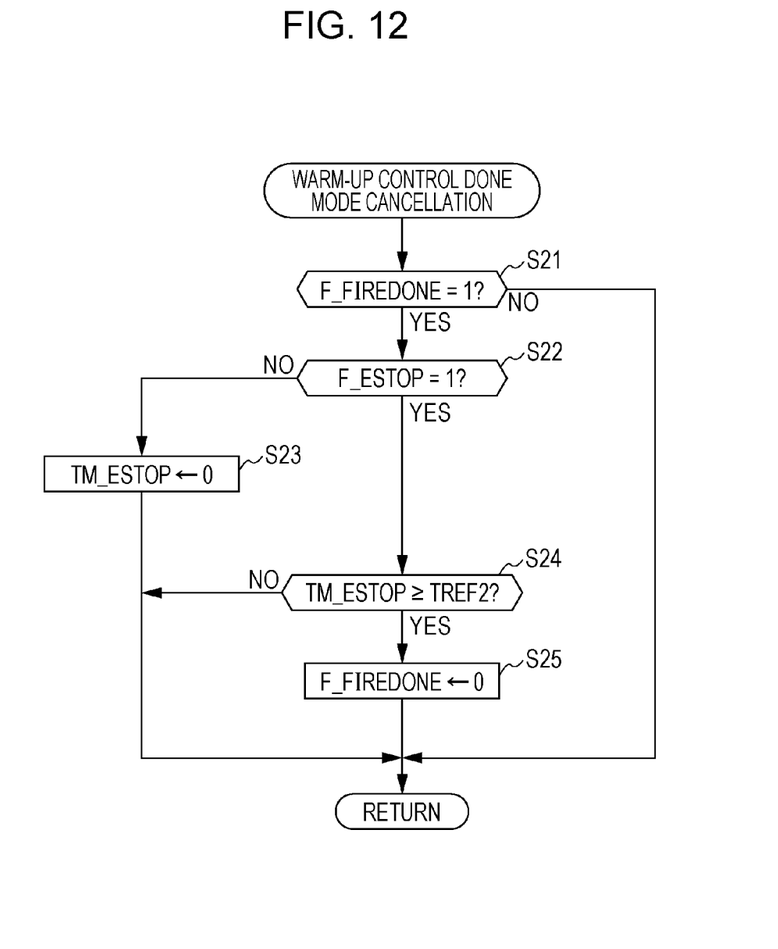
FIG. 12 is a flowchart illustrating a process for canceling a warm-up control done state.

A process of canceling a warm-up control done mode will be described with reference to FIG. 12. This process is to reset the warm-up control done flag F_FIREDONE to "0" when a predetermined condition is satisfied after completion of the warm-up control.

In this process, whether the warm-up control done flag F_FIREDONE indicates "1" is determined in step S21. If NO, the process is terminated. If YES in step S21, namely, the warm-up control has already been completed, whether an engine stop flag F_ESTOP indicates "1" is determined in step S22. The engine stop flag F_ESTOP is set to "1" while the engine 3 is in a stopped state (i.e., no combustion is performed), for example, during the above-described fuel cut in the deceleration operation or during idle stop while the vehicle V is stopped.

If NO in step S22, namely, the engine 3 is not in the stopped state, a value (hereinafter, "stop timer value") TM_ESTOP of a count up timer for measuring a duration of the stopped state is reset to "0" in step S23 and the process is then terminated.

On the other hand, if YES in step S22, namely, the engine 3 is in the stopped state, whether the stop timer value TM_ESTOP is greater than or equal to predetermined time TREF2 (for example, 600 s) is determined in step S24. If NO in step S24, the process is terminated.

On the other hand, if YES in step S24, namely, the stopped state of the engine 3 has been continued for the predetermined time TREF2 or longer, it is determined that the catalytic converter 23 has changed from the active state to the inactive state and the warm-up control done flag F_FIREDONE is reset to "0" in step S25. The process is terminated.

If the warm-up control done flag F_FIREDONE is reset to "0" in such a manner, the answer in step S1 in the warm-up control process of FIG. 4 will be NO upon the next start-up of the engine 3, thus again performing the warm-up control.

As described above, according to the embodiment, when motoring fuel cut involving motoring of the engine 3 by the first motor 4 is requested before start of warm-up control for the catalytic converter 23 or during the warm-up control upon start-up of the engine 3, the warm-up control is suspended or terminated and the motoring fuel cut is preferentially executed. Thus, a magnetoresistance associated with the electric power generating operation of the second motor 5 is activated, thus providing a braking force of the vehicle V required for the deceleration operation.

Since the warm-up control is executed at completion of the motoring fuel cut, the opportunity for warm-up control can be secured. In addition, if the catalytic converter 23 is cooled by incoming air during the motoring fuel cut and the temperature of the catalytic converter 23 is reduced, the catalytic converter 23 can be heated by warm-up control, so that the catalytic converter 23 can be reliably activated.

As regards the first reference water temperature TW1 for setting the first parameter (the warm-up control estimated execution time TREF1, the target engine revolution number NECMD, the target air-intake QACMD, the target ignition timing IGCMD, the target intake cam phase CAINCMD, and the fuel reduction coefficient KF1) used in warm-up control, if motoring fuel cut has already been executed, the engine water temperature TW detected upon start of the motoring fuel cut is used. If the motoring fuel cut has not been executed yet, the engine water temperature TW detected upon start of the warm-up control is used.

Accordingly, if the correlation among the engine water temperature TW and the temperatures TCAT1 and TCAT2 of the catalytic converter 23 is reduced due to the execution of the motoring fuel cut, the first parameter which more adequately reflects the temperature of the catalytic converter 23 at that time can be appropriately set. Thus, the warm-up control can be more appropriately performed.

As regards the second reference water temperature TW2 for setting the second parameter (the fuel increase coefficient KF2), the engine water temperature TW detected during execution of the warm-up control is used, regardless of whether motoring fuel cut has already been executed. Accordingly, the second parameter which more adequately reflects the temperature of the engine 3 at that time can be appropriately set, so that the warm-up control can be more appropriately performed.

If output torque from the engine 3 and the first motor 4 exceeds or falls below request torque required for the vehicle V, an excess of torque may be absorbed by electric power generation of the second motor 5 and charging of the battery 8, alternatively, a lack of torque may be compensated for by torque produced by power running of the second motor 5.

Accordingly, the warm-up control parameters can be freely set so that desired warm-up control characteristics of the catalytic converter 23, desired exhaust gas characteristics, and desired fuel economy are provided without restriction on output torque while a torque request to the vehicle V is satisfied. Consequently, the warm-up control can be appropriately performed and good exhaust gas characteristics and good fuel economy can be maintained during the warm-up control.

If the stopped state, such as fuel cut or idle stop, of the engine 3 has been continued for the predetermined time TREF2 or longer after completion of the warm-up control, it is determined that the catalytic converter 23 has changed to the inactive state and the warm-up control done flag F_FIRE-DONE is reset to "0". Accordingly, the warm-up control will be again executed upon the next start-up of the engine 3. Thus, the catalytic converter 23 can be early returned to the active state.

The present disclosure is not limited to the above-described embodiment and various modifications can be made. For example, although the above-described embodiment relates to motoring fuel cut involving fuel supply stop as motoring of the engine 3 by the first motor 4, the present disclosure is not limited to the embodiment. The embodiment may be applied to any case where output torque of the first motor 4 is larger than that of the engine 3. For example, the embodiment may be applied to a case where motoring torque of the first motor 4 exceeds output torque of the engine 3 while the vehicle V travels down a gentle hill. In such a case, although the amount of exhaust gas from the engine 3 is relatively small and the temperature of the catalytic converter 23 is less increased, the temperature of the engine 3 is more increased due to motoring. The correlation between these temperatures tends to be reduced. Accordingly, advantages described in the above embodiment can be similarly achieved.

Although the vehicle V according to the above-described embodiment is of a type that includes the first motor 4 mechanically coupled to the engine 3 and further includes the second motor 5 electrically connected to the first motor 4, the type of vehicle is not limited to that one. The embodiment may be applied to a hybrid vehicle of a type that eliminates the second motor 5.

The first and second parameters described in the above embodiment are intended to be illustrative only and any other suitable parameter may be used. Furthermore, although the engine water temperature TW is used as a temperature parameter indicating the temperature of the engine 3 in the above embodiment, the temperature parameter is not limited to that one. Any other suitable parameter, for example, a temperature of oil lubricating the engine 3 may be detected and used. Alternatively, the engine water temperature or the oil temperature may be obtained by estimation based on an integrated value of the fuel injection amount or air-intake without using a temperature sensor.

In the above-described embodiment, the determination as to whether the catalytic converter 23 has changed to the inactive state in association with the stop of the engine 3 is made on the basis of a parameter indicating the duration of the stopped state of the engine 3. The determination may be made by, for example, estimation of the temperature of the catalytic converter 23 and comparison between the estimated temperature and a threshold value. The details of the configuration may be varied as appropriate within the spirit and scope of the present disclosure.

An aspect of an embodiment provides a catalytic converter warm-up control apparatus for a hybrid vehicle that includes an internal combustion engine (internal combustion engine 3 in an embodiment), a drive wheel (front wheel WF), a first electric motor (first motor 4) capable of supplying and receiving motive power to and from the internal combustion engine and the drive wheel, and a catalytic converter (catalytic converter 23 including a close-coupled catalytic converter 23a and an underfloor catalytic converter 23b) purifying an exhaust gas discharged from the internal combustion engine, the apparatus including a catalytic converter warm-up control unit (engine control unit (ECU) 2, FIG. 4) that executes warm-up control for warming up the catalytic converter to activate the catalytic converter upon start-up of the internal combustion engine, a temperature parameter acquisition unit (water temperature sensor 32) that acquires a temperature parameter (engine water temperature TW) indicating a temperature of the internal combustion engine, a warm-up control parameter setting unit (ECU 2, steps S9, S13, and S15 in FIG. 4) that sets warm-up control parameters (a first parameter and a second parameter) used in the warm-up control in accordance with the acquired temperature parameter, and a motoring execution unit (ECU 2) that executes motoring of the internal combustion engine by the first electric motor in a predetermined operation state. The catalytic converter warm-up control unit executes the warm-up control in accordance with an execution state of the motoring.

This hybrid vehicle includes the internal combustion engine, the first electric motor capable of supplying and receiving motive power to and from the internal combustion engine and the drive wheel. The hybrid vehicle travels by transmitting motive power produced by combustion in the internal combustion engine through the first electric motor to the drive wheel. The motoring of the internal combustion engine by the first electric motor is executed in a predetermined operation state of the hybrid vehicle. Upon start-up of the internal combustion engine, the warm-up control for the catalytic converter is executed to activate the catalytic converter for purifying an exhaust gas. The temperature parameter indicating the temperature of the internal combustion engine is acquired and the warm-up control parameters are set in accordance with the acquired temperature parameter. The warm-up control is performed using the warm-up control parameters.

While the hybrid vehicle with the above-described configuration is in an operation state involving combustion in the internal combustion engine, a high-temperature exhaust gas produced by the combustion is supplied to the catalytic converter. Accordingly, a predetermined correlation in temperature between the internal combustion engine and the catalytic converter is maintained. On the other hand, in the case where the above-described motoring is executed, the correlation tends to be reduced because the temperatures are increased due to air compression in a cylinder or friction caused by the motoring.

From the above-described point of view, according to the embodiment, the warm-up control for the catalytic converter is executed in accordance with an execution state of the motoring. Accordingly, the warm-up control can be appropriately performed using the warm-up control parameters set in accordance with the temperature parameter indicating the temperature of the internal combustion engine under conditions that the correlation in temperature between the internal combustion engine and the catalytic converter tends to be reduced. Furthermore, since the warm-up control is performed using the temperature parameter indicating the temperature of the internal combustion engine, a sensor, used in related art, for detecting the temperature of the catalytic converter can be eliminated. This results in a reduction in cost.

In this aspect of the embodiment, the motoring may be fuel cut for stopping supply of fuel to the internal combustion engine while motoring the internal combustion engine by the first electric motor in a predetermined deceleration operation state. The catalytic converter warm-up control unit may suspend the warm-up control during execution of the fuel cut and then execute the warm-up control at completion of the fuel cut (steps S2 to S5 and S11 in FIG. 4).

In such a configuration of the embodiment, as motoring of the internal combustion engine, the fuel cut (hereinafter, referred to as "motoring fuel cut" as appropriate) is executed which is to stop supply of fuel to the internal combustion engine while motoring the internal combustion engine by the first electric motor. If such motoring fuel cut is executed, a large quantity of air which is not subjected to combustion would be supplied to the catalytic converter. The temperature of the catalytic converter would not rise, alternatively, fall, thus resulting in a more significant reduction in correlation in temperature between the internal combustion engine and the catalytic converter.

In this configuration of the embodiment, since the warm-up control is suspended during execution of the motoring fuel cut, the fuel cut is preferentially executed. Accordingly, a braking force of the vehicle required for a deceleration operation can be provided by engine braking due to motoring of the internal combustion engine. In addition, sine the warm-up control is executed at completion of the fuel cut, an opportunity for the warm-up control can be secured.

In this aspect of the embodiment, the warm-up control parameter may include a first parameter (warm-up control estimated execution time TREF1, a target engine revolution number NECMD, a target air-intake QACMD, target ignition timing IGCMD, a target intake cam phase CAINCMD, and a fuel reduction coefficient KF1) depending on a temperature of the catalytic converter and a second parameter (fuel increase coefficient KF2) depending on the temperature of the internal combustion engine. Preferably, when the fuel cut is executed before the warm-up control is started upon start-up of the internal combustion engine, the catalytic converter warm-up control unit executes the warm-up control at completion of the fuel cut (steps S2 to S5 and S11 in FIG. 4) and the warm-up control parameter setting unit sets the first parameter in accordance with the temperature parameter (first reference water temperature TW1) acquired upon start of the fuel cut (steps S3, S4, S9, and S13 in FIG. 4).

In such a configuration of the embodiment, when the motoring fuel cut is executed before the warm-up control is started upon start-up of the internal combustion engine, the warm-up control is executed at completion of the motoring fuel cut and the first parameter, included in the warm-up control parameters, depending on the temperature of the catalytic converter is set in accordance with the temperature parameter acquired upon start of the fuel cut. As described above, in the case where the motoring fuel cut is executed, the temperature of the internal combustion engine gradually differs from the temperature of the catalytic converter with progression of the fuel cut.

Since the first parameter depending on the temperature of the catalytic converter is set in accordance with the temperature parameter acquired upon start of the motoring fuel cut as described above, therefore, if the correlation in temperature between the internal combustion engine and the catalytic converter tens to be reduced, the first parameter can be appropriately set such that the first parameter more adequately reflects the temperature of the catalytic converter at that time and the warm-up control can be more appropriately performed.

In this aspect of the embodiment, preferably, the warm-up control parameter setting unit sets the second parameter in accordance with the temperature parameter (second reference water temperature TW2) acquired during execution of the warm-up control, regardless of whether the fuel cut has already been executed (steps S11, S14, and S15 in FIG. 4).

Unlike the above-described first parameter, the second parameter depends on the temperature of the internal combustion engine. Accordingly, if the temperature of the internal combustion engine changes so as to gradually differ from the temperature of the catalytic converter in association with execution of the motoring fuel cut, the second parameter should be set in accordance with the changed temperature of the internal combustion engine. From the above-described point of view, according to the embodiment, the second parameter is set in accordance with the temperature parameter acquired during execution of the warm-up control, regardless of whether the motoring fuel cut has already been executed. Accordingly, the second parameter can be appropriately set such that the second parameter more adequately reflects the temperature of the internal combustion engine at that time and the warm-up control can be more appropriately performed.

In this aspect of the embodiment, preferably, the catalytic converter warm-up control unit terminates the warm-up control when the fuel cut is requested during execution of the warm-up control and again executes the warm-up control at completion of the fuel cut (steps S2, S5, and S11 in FIG. 4).

In such a configuration of the embodiment, when the motoring fuel cut is requested during execution of the warm-up control, the warm-up control is terminated and the fuel cut is preferentially executed, so that a braking force of the vehicle required for the deceleration operation can be provided. Since the warm-up control is again executed at completion of the fuel cut, if the temperature of the catalytic converter is reduced during the motoring fuel cut because the catalytic converter is cooled by incoming air, the catalytic converter can be heated by the warm-up control and be reliably activated.

In this aspect of the embodiment, the catalytic converter warm-up control apparatus may further include an inactive-state determination unit (ECU 2, FIG. 12) that determines whether the catalytic converter has changed from an active state to an inactive state in association with a stopped state of the internal combustion engine including the fuel cut after completion of the warm-up control. Preferably, when it is determined that the catalytic converter has changed to the inactive state, the catalytic converter warm-up control unit again executes the warm-up control upon the next start-up of the internal combustion engine (steps S1 and S11 in FIG. 4).

If the stopped state, such as fuel cut or idle stop, of the internal combustion engine is continued or often occurs after completion of the warm-up control, the temperature of the catalytic converter may be reduced such that the catalytic converter changes from the active state to the inactive state. According to this embodiment, such a condition is determined. If it is determined that the catalytic converter has changed to the inactive state, the warm-up control is again executed upon the next start-up of the internal combustion engine. Advantageously, the catalytic converter can be early returned to the active state.

In this aspect of the embodiment, the hybrid vehicle may further include a second electric motor (second motor 5) that is capable of supplying and receiving electric power to and from the first electric motor and is capable of supplying and receiving motive power to and from the drive wheel.

In such a configuration of the embodiment, if output torque from the internal combustion engine and the first electric motor exceeds or falls below requested torque required for the vehicle during the warm-up control, an excess or lack of torque can be absorbed or compensated for by the second electric motor. Accordingly, the warm-up control parameters can be freely set such that desired catalytic converter warm-up control characteristics, desired exhaust gas characteristics, and desired fuel economy can be provided without restriction on output torque while a torque request to the vehicle is satisfied. Advantageously, the warm-up control can be appropriately performed and good exhaust gas characteristics and good fuel economy can be maintained during the warm-up control.

Obviously, numerous modifications and variations of the present invention are possible in light of the above teachings. It is therefore to be understood that within the scope of the appended claims, the invention may be practiced otherwise than as specifically described herein.

What is claimed is:

1. A catalytic converter warm-up control apparatus for a hybrid vehicle, comprising:
   a catalytic converter warm-up controller configured to execute warm-up control to warm up a catalytic converter of the hybrid vehicle for activating the catalytic converter upon start-up of an internal combustion engine provided in the hybrid vehicle, the catalytic converter being provided to purify an exhaust gas discharged from the internal combustion engine;
   a temperature parameter acquisition device configured to acquire a temperature parameter indicating a temperature of the internal combustion engine;
   a warm-up control parameter setting device configured to set warm-up control parameters used in the warm-up control in accordance with the temperature parameter acquired by the temperature parameter acquisition device; and
   a motoring execution device configured to execute motoring of the internal combustion engine by a first electric motor in a predetermined operation state, the first electric motor being provided to supply and receive motive power to and from the internal combustion engine and a drive wheel of the hybrid vehicle, the catalytic converter warm-up controller being configured to execute the warm-up control in accordance with an execution state of the motoring,
   wherein the motoring comprises fuel cut to stop supply of fuel to the internal combustion engine while motoring the internal combustion engine by the first electric motor in a predetermined deceleration operation state,
   wherein the catalytic converter warm-up controller is configured to suspend the warm-up control during execution of the fuel cut and configured to execute the warm-up control at completion of the fuel cut,
   wherein the warm-up control parameters include a first parameter depending on a temperature of the catalytic converter and a second parameter depending on the temperature of the internal combustion engine, and
   wherein if the fuel cut is requested before the warm-up control is started upon start-up of the internal combustion engine, the catalytic converter warm-up controller executes the warm-up control at completion of the fuel cut and the warm-up control parameter setting device sets the first parameter in accordance with the temperature parameter acquired by the temperature parameter acquisition device upon start of the fuel cut.

2. The apparatus according to claim 1, wherein the warm-up control parameter setting device is configured to set the second parameter in accordance with the temperature parameter acquired by the temperature parameter acquisition device during execution of the warm-up control, regardless of whether the fuel cut has already been executed.

3. The apparatus according to claim 2, wherein the catalytic converter warm-up controller terminates the warm-up control if the fuel cut is requested during execution of the warm-up control, and again executes the warm-up control at completion of the fuel cut.

4. The apparatus according to claim 3, further comprising:
   an inactive-state determination device configured to determine whether the catalytic converter has changed from an active state to an inactive state as a stopped state of the internal combustion engine including the fuel cut is continued after completion of the warm-up control,
   wherein if it is determined that the catalytic converter has changed to the inactive state, the catalytic converter warm-up controller again executes the warm-up control upon next start-up of the internal combustion engine.

5. The apparatus according to claim 4, wherein the hybrid vehicle further includes a second electric motor provided to supply and receive electric power to and from the first electric motor and provided to supply and receive motive power to and from the drive wheel.

6. The apparatus according to claim 1, wherein the catalytic converter warm-up controller terminates the warm-up control if the fuel cut is requested during execution of the warm-up control, and again executes the warm-up control at completion of the fuel cut.

7. The apparatus according to claim 6, further comprising:
   an inactive-state determination device configured to determine whether the catalytic converter has changed from an active state to an inactive state as a stopped state of the internal combustion engine including the fuel cut is continued after completion of the warm-up control,
   wherein if it is determined that the catalytic converter has changed to the inactive state, the catalytic converter warm-up controller again executes the warm-up control upon next start-up of the internal combustion engine.

8. The apparatus according to claim 6, wherein the hybrid vehicle further includes a second electric motor provided to supply and receive electric power to and from the first electric motor and provided to supply and receive motive power to and from the drive wheel.

9. The apparatus according to claim 1, further comprising:
   an inactive-state determination device configured to determine whether the catalytic converter has changed from an active state to an inactive state as a stopped state of the internal combustion engine including the fuel cut is continued after completion of the warm-up control,
   wherein if it is determined that the catalytic converter has changed to the inactive state, the catalytic converter warm-up controller again executes the warm-up control upon next start-up of the internal combustion engine.

10. The apparatus according to claim 1, wherein the hybrid vehicle further includes a second electric motor provided to supply and receive electric power to and from the first electric motor and provided to supply and receive motive power to and from the drive wheel.

11. The apparatus according to claim 2, further comprising:
   an inactive-state determination device configured to determine whether the catalytic converter has changed from an active state to an inactive state as a stopped state of the internal combustion engine including the fuel cut is continued after completion of the warm-up control,
   wherein if it is determined that the catalytic converter has changed to the inactive state, the catalytic converter warm-up controller again executes the warm-up control upon next start-up of the internal combustion engine.

12. The apparatus according to claim 2, wherein the hybrid vehicle further includes a second electric motor provided to supply and receive electric power to and from the first electric motor and provided to supply and receive motive power to and from the drive wheel.

13. The apparatus according to claim 3, wherein the hybrid vehicle further includes a second electric motor provided to supply and receive electric power to and from the first electric motor and provided to supply and receive motive power to and from the drive wheel.

* * * * *